Patented Feb. 19, 1935

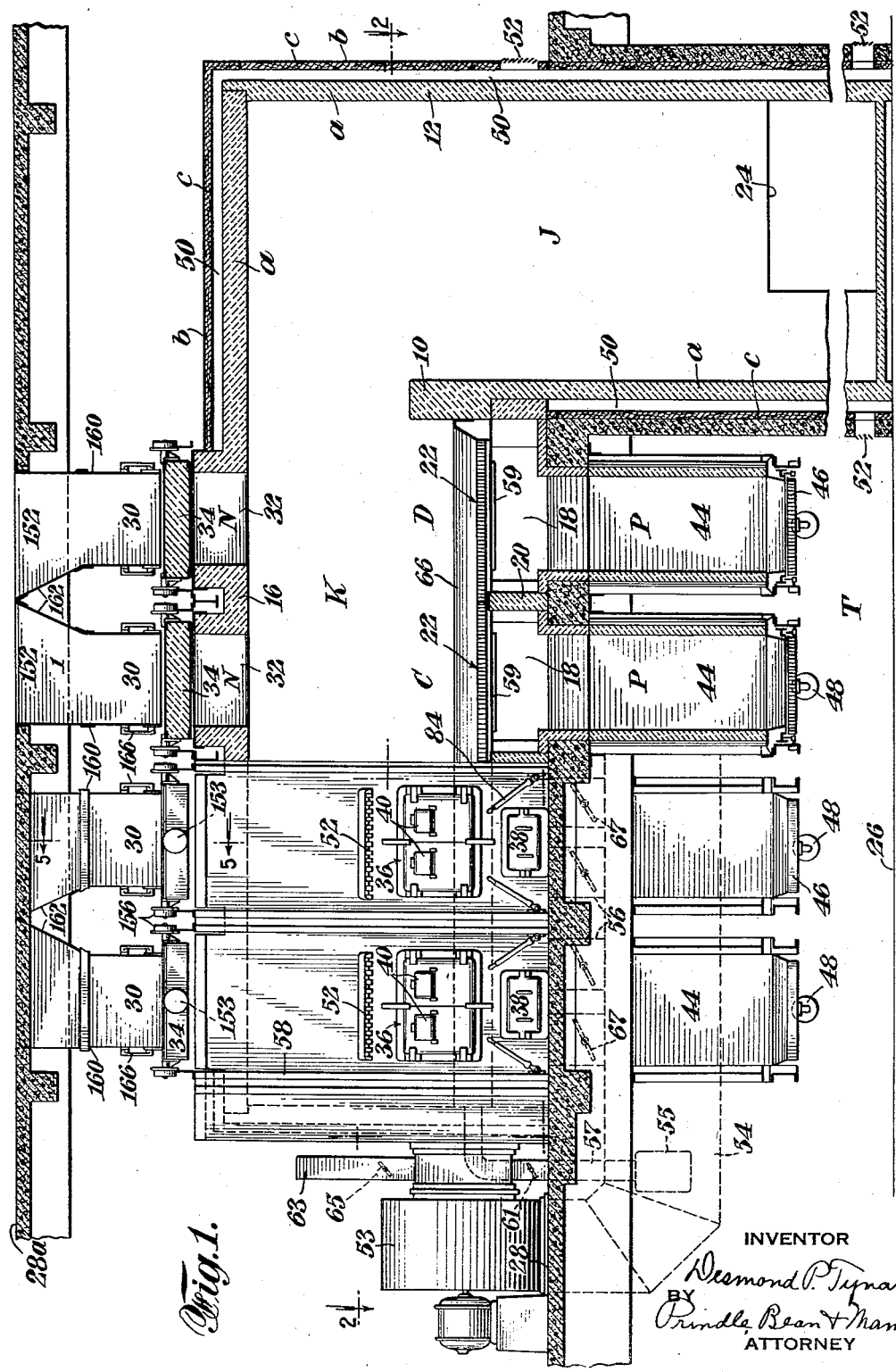

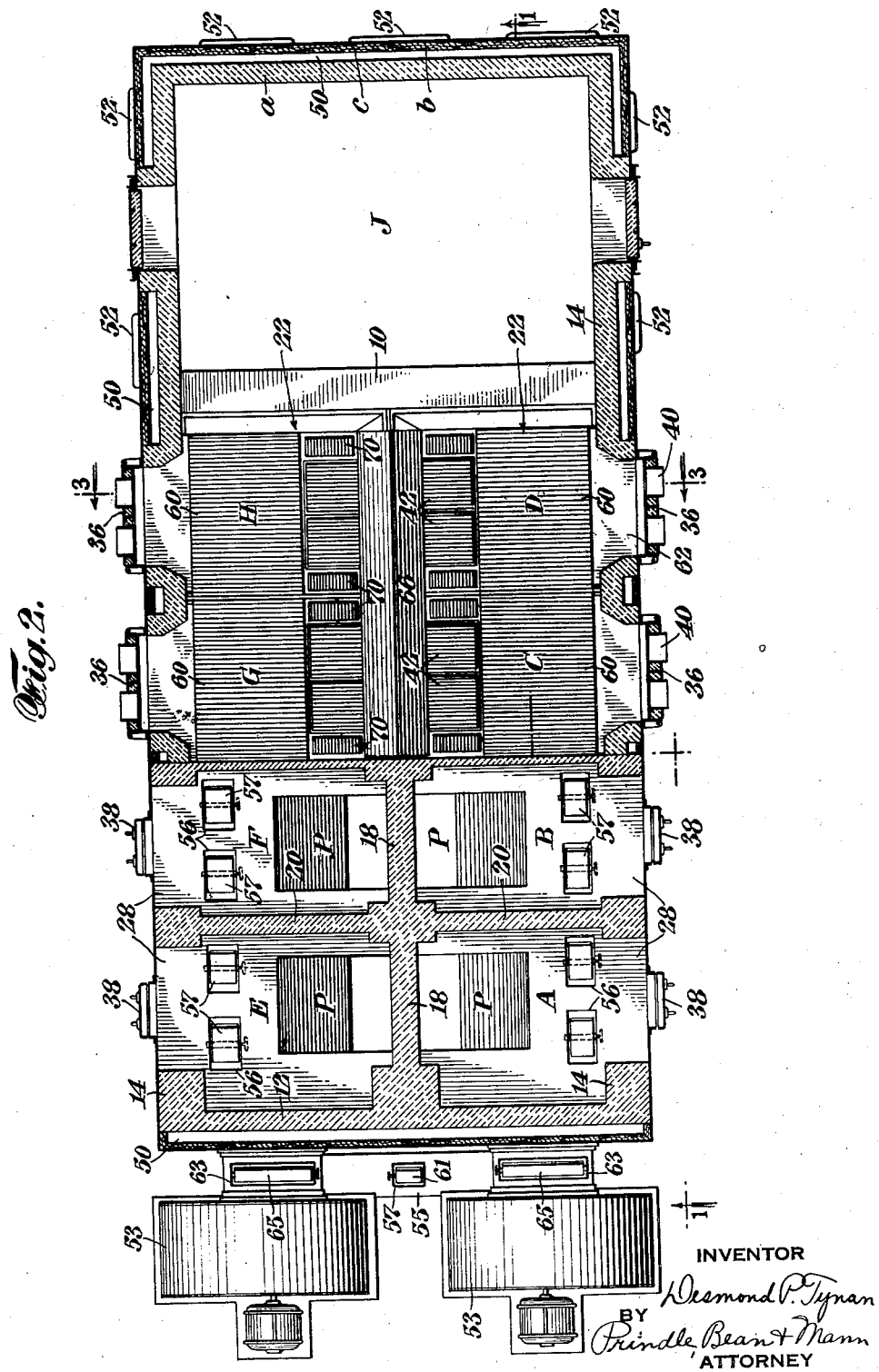

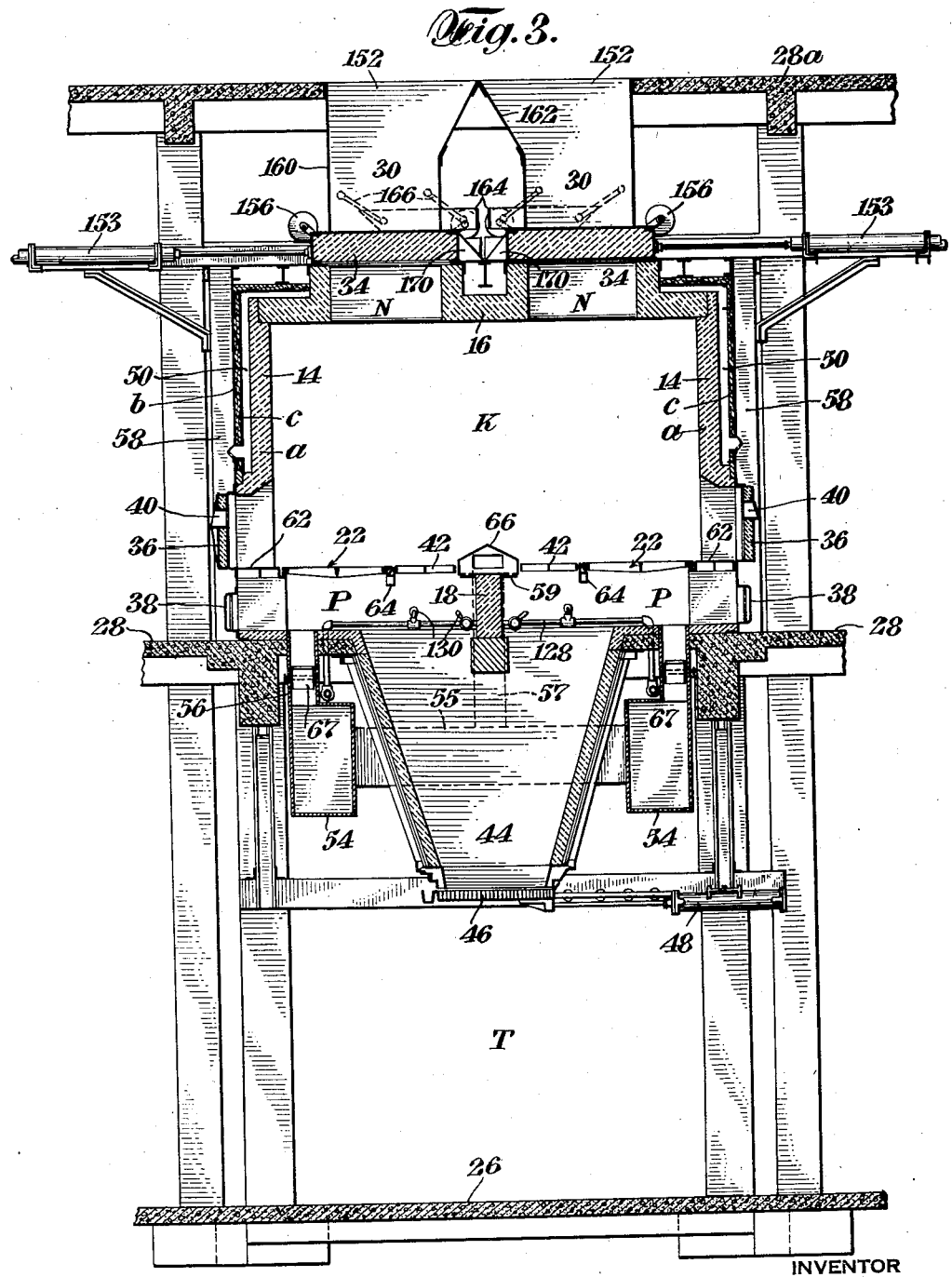

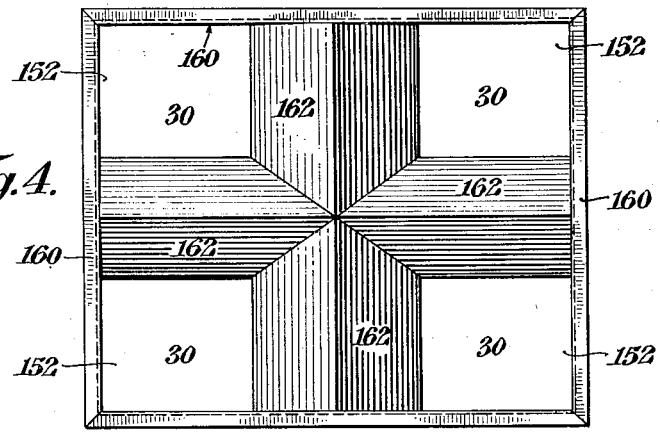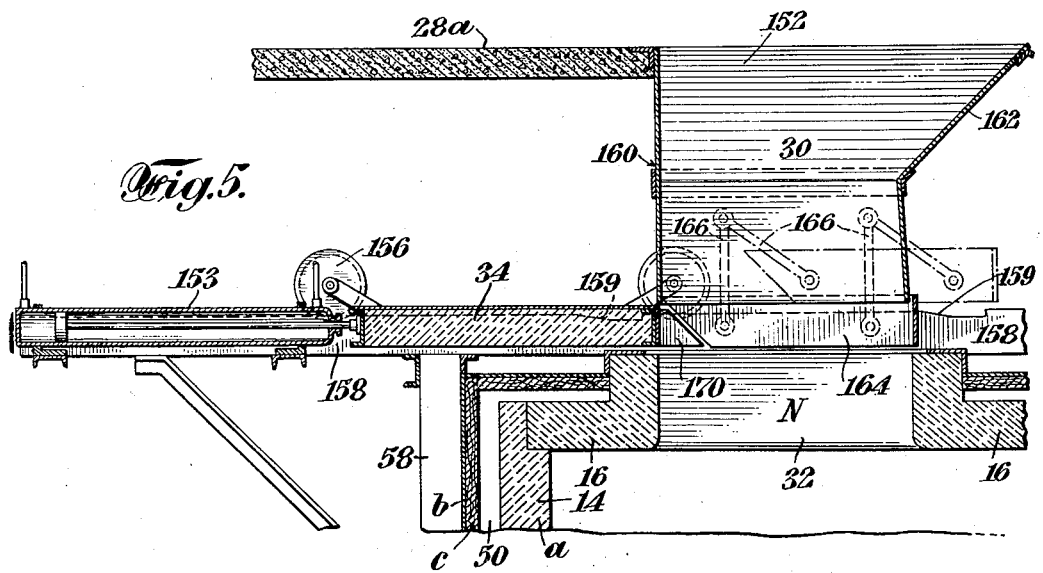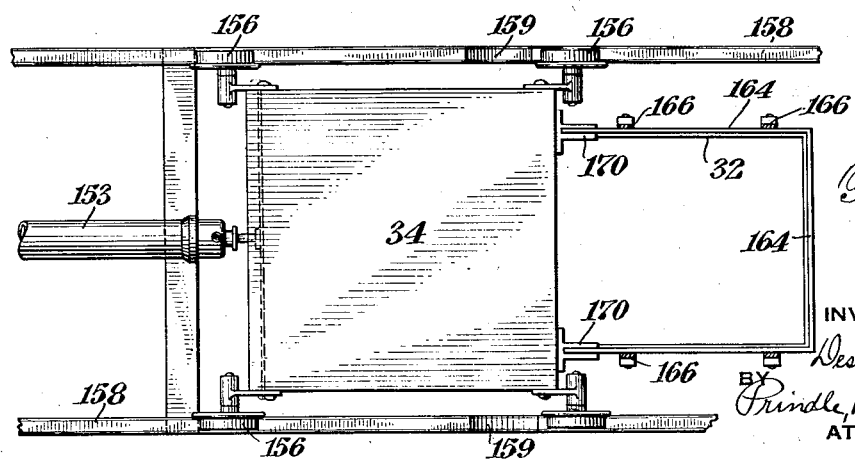

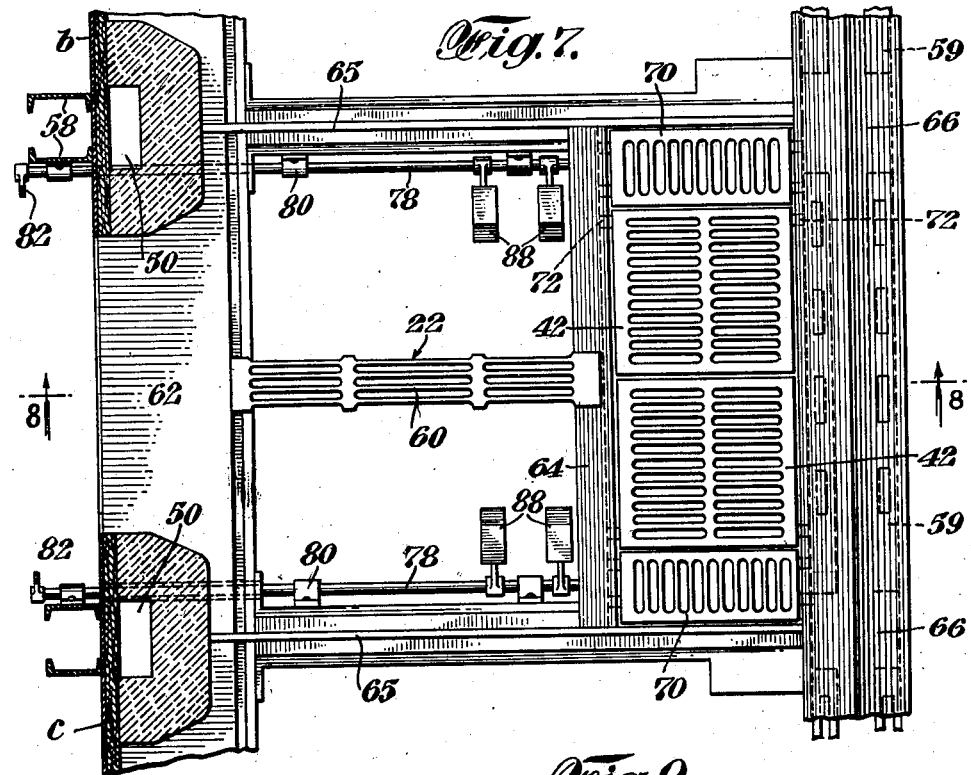
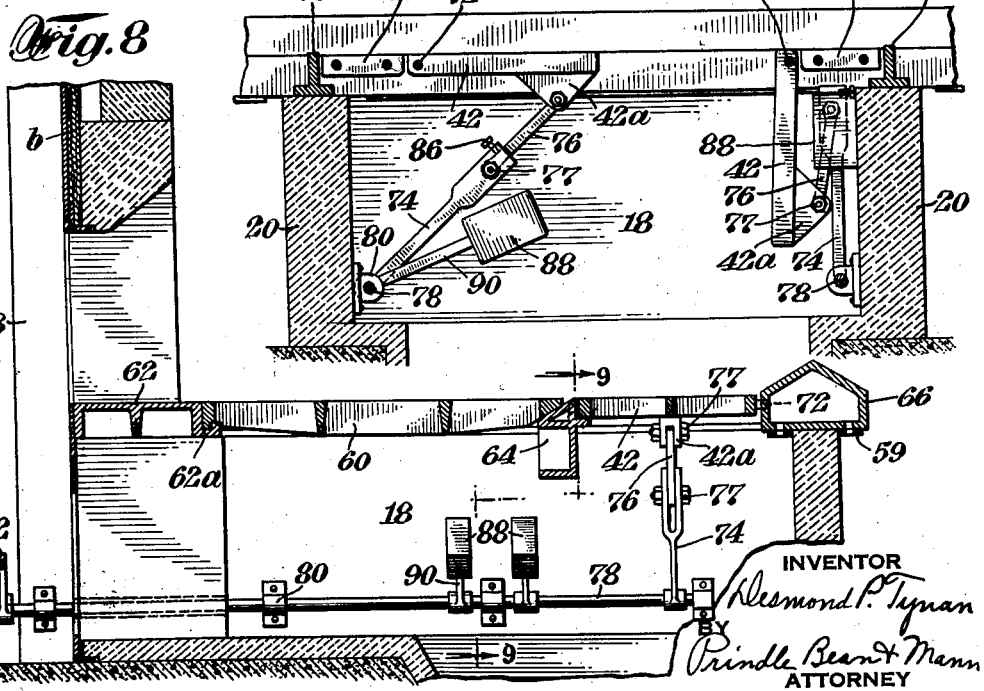

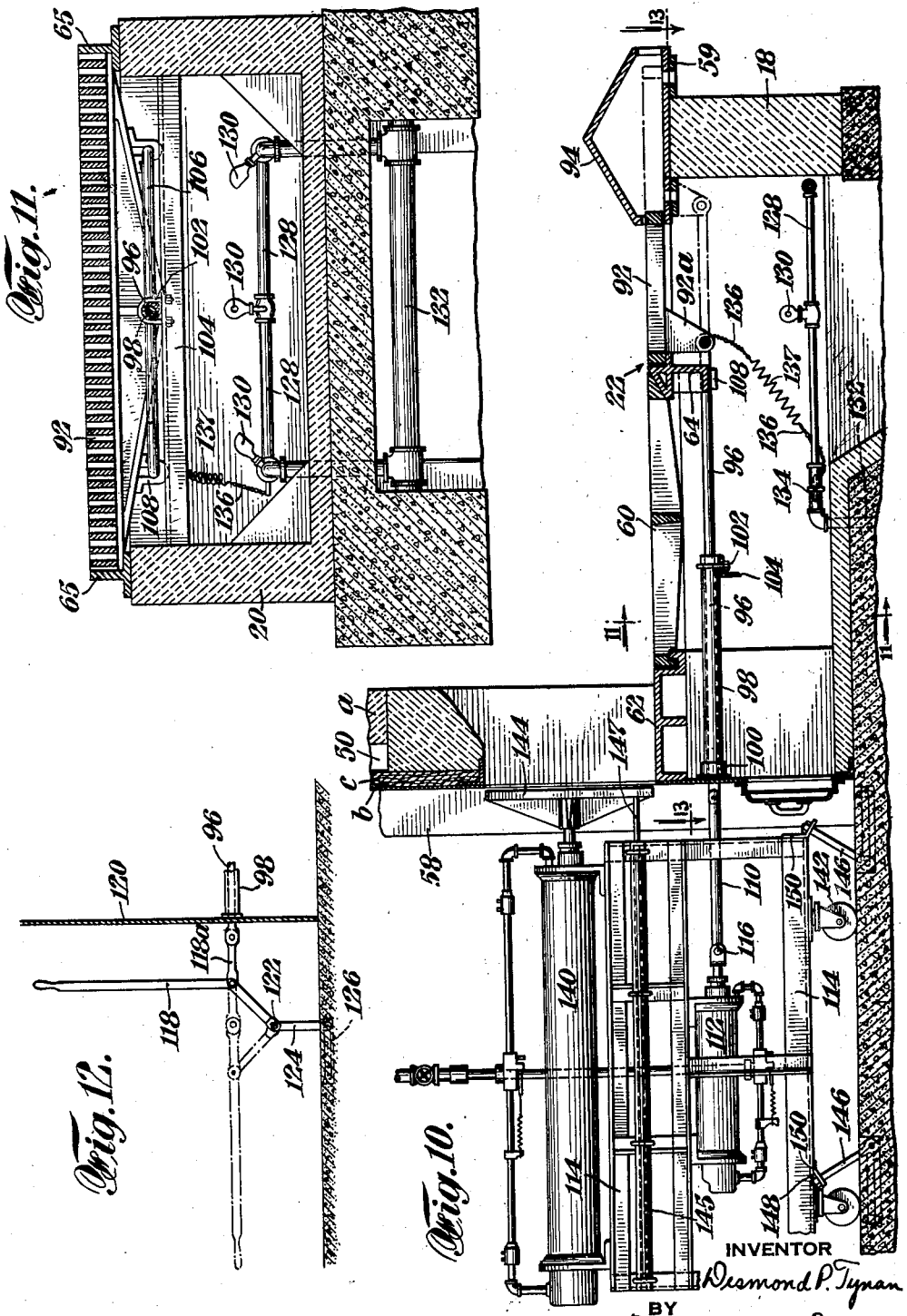

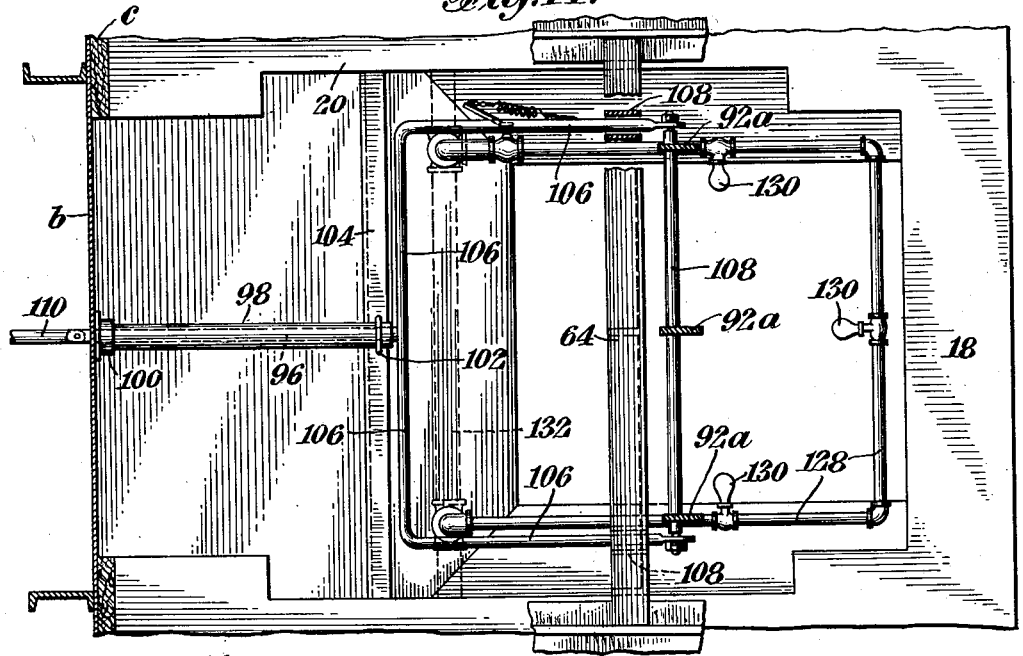

1,991,828

UNITED STATES PATENT OFFICE 1,991,828

INCINERATING FURNACE

Desmond P. Tynan, Bellerose, N. Y., assignor, by mesne assignments, to Hiler Engineering & Construction Company, Inc., a corporation of New York Application July 19, 1932, Serial No. 623,340

11 Claims. (Cl. 110—8)

The present invention relates to improvements in incinerating furnaces.

Its object is to increase the incinerating efficiency and capacity of such furnaces and to decrease their cost of construction and operating expense. Among its features are the following:

Instead of constructing the furnace with its cells comprising ash pits and grates in a single longitudinal row, I construct for example, an eight cell incinerating furnace so as to have two longitudinal rows side by side of four cells each. Heretofore an eight cell furnace would have been made up with the eight cells in a single longitudinal row or if the cells were arranged in two side by side longitudinal rows they would have been separated by a complete divisional wall dividing the furnace practically into independent halves.

My improved furnace has no such divisional wall so that if it be an eight cell furnace as happens to be shown for purposes of illustration in the annexed drawings, all eight cells above the grates will be in free communication with one another both longitudinally and transversely of the burning chamber. The result is that in my improved furnace the charge in every cell is effected by the heat from the burning charges in every other cell both longitudinally and transversely of the furnace.

This is important when it is considered that this is a refuse and garbage incinerating furnace and that the charges are more or less wet when delivered on the grates of the individual cells and must be dried by the heat coming from the previously dried and then actively burning charges on adjacent grates. After the wet charges have become sufficiently dried by this heat, which is accomplished with special efficiency in the present furnace, these charges automatically take fire and are themselves consumed and meanwhile deliver their heat to fresh charges applied to one or more of the other grates.

This interaction between the actively burning charges on some of the grates and the wet charges to be dried out and put into a combustible condition on other grates may be described by the convenient term "mutual assistance"; and in the new style furnace there is not only the single mutual assistance of grates arranged in a single longitudinal series but the double mutual assistance derived from or contributed to the grates in a second longitudinal series located side by side with the first.

As a consequence of the construction embodying the aforesaid double mutual assistance feature, other features of construction and operation are made possible including the following:

The fact that there is no divisional wall between the two longitudinal rows of cells that if present would in effect divide the burning chamber into two burning chambers, makes it possible for the operators to use their clinkering and stoking tools without damaging the back or any other wall of the furnace. This was unavoidable in the old style furnace because there was a back wall to each cell which unavoidably received the impact of the tools. In the present furnace, the charges on each pair of grates transversely of the furnace, are workable by tools inserted through doors at opposite sides of the burning chamber; and because as aforesaid there is no longitudinal division wall, there is nothing to interfere with the thrust of the tools or to be destroyed by their impact.

In the old style furnace on account of this rear wall, it would have been impracticable to build the furnace with a double wall with intervening air space for preheating the air preparatory to its delivery under the grates. In the old style furnace an extra preheater unit had to be used as a separate unit for preheating the air. As compared with this, the present furnace makes a double-wall construction with intervening airspace entirely practicable and saves the expense and maintenance of the special pre-heating unit.

A further effect of the double mutual assistance both lengthwise and transversely is that it enables each grate to be made shorter in depth than in the old style furnace with the result that the working tools which the men have to manipulate by hand can be made several feet shorter so that the labor is not nearly so arduous and the work, stoking and clinkering, can be done much more effectively.

In short, if the old style furnace had four cells in a single longitudinal row, the new style has a double row of shorter depth cells, the total grate surface of which will much exceed the other, so that the incinerator will have that much greater capacity and yet each grate will have less depth than in an old style furnace, and therefore, can be stoked and clinkered more effectively and this can be done without damaging any back wall and this carries with it the additional advantage that makes it possible to build the furnace with the double wall air space for preheating the air for delivery under the grates and thereby doing away with the necessity of any special preheater unit.

The aforesaid improved construction also makes it possible with decided increase in efficiency of incineration to give better distribution to the charges of débris and garbage as delivered upon the grates. Thus, it enables each grate to have its own charging hopper and enables it to be located more centrally over the corresponding grate.

Further improvement resides in the provision of means for distributing the charge to four hoppers at a time, that is to say, to half of the particular furnace illustrated. Moreover, individual operable gates are provided for controlling the delivery from each hopper to its cell of the furnace; and there is further provided automatically operated means which gives continuity to the chutes of the individual hoppers into the corresponding furnace charging-openings when the gates are withdrawn.

The improved construction also enables each grate to have a movable portion in the center longitudinal zone of the burning chamber for discharging the incinerated charges into the ash-pit and ash-hopper when the particular cell and grate are cleaned. One construction as to this feature involves providing a low housing running lengthwise of the burning chamber between the longitudinal rows of grates, said housing being located on a low divisional wall between the ash-pits of the two rows of cells. The movable grates in this instance when moved into their open position slide into this housing through appropriate openings in its longitudinal side walls. In another construction shown herein, the movable grates are hinged and pivotable. In any event, two movable grates are independently operable for the individual cells; and this may be either by a hand lever construction or by a compressed-air piston and cylinder or the like, as may be preferred.

A further feature is a power-operated ram mounted for portability on a carriage movable along the stoking floor at the sides of the burning chamber, the ram having a transverse end plate or pusher-head of an area nicely permitting it to pass through the clinker door whereby said pusher-head when the ram is operated shoves the incinerated mass on the grate before it into the discharge opening left by the previously opened movable portion of the grate. This operation is called "cleaning" and heretofore this had to be done by hand-operated tools and consumed a great deal of time now saved by the present construction.

To sum up, the improved furnace is adapted to embody the following features above discussed.

1. The double mutual assistance feature due to the double longitudinal row of cells and grates with in effect no dividing longitudinal wall between them so far as concerns the direct transfer of heat between the charges on the grates.

2. A double-wall air-space construction adapted and arranged to preheat the air for use under the grates, said construction being made possible because there is in effect no back wall to the cells.

3. Each cell can be shorter in depth than in the usual back-wall furnace; and thus enables the use of shorter working tools.

4. The improved construction is adapted to provide two charging hoppers per transverse pair of cells giving better distribution of the fresh charges on the grates.

5. It further enables an improved hopper construction which automatically distributes the charge to four longitudinally and transversely adjacent cells of the furnace.

6. It also enables an improved gate construction for controlling each cell hopper which automatically gives continuity between the chute of the hopper and the charging opening of the furnace after its gate has been withdrawn.

7. The improved construction makes practicable the location of the movable sections of the grates in the center longitudinal zone of the burning chamber in position for efficient cleaning and dumping of the charges from the grates.

8. It also enables the use of a mechanical power-operated cleaning machine.

9. The construction further enables the use of water sprinklers or quenchers automatically operated by the movable grates; also by hand, as desired.

In the drawings illustrating an eight cell incinerating furnace, in a preferred form within my invention including modifications thereof:—

Fig. 1 is a combined side elevational and vertical longitudinal sectional view through such furnace taken on the line 1—1 in Fig. 2 looking in the direction of the arrows, a portion of the combustion chamber being shown broken away to save space in illustration.

Fig. 2 is a plan view partly in horizontal section taken on the line 2—2 in Fig. 1 looking in the direction of the arrows.

Fig. 3 is a transverse section partly in elevation on the line 3—3 in Fig. 2 looking in the the direction of the arrows.

Fig. 4 is an enlarged plan looking down on the hopper construction shown in vertical section in Figs. 1 and 3.

Fig. 5 is an enlarged vertical section of that portion of Fig. 3 which relates to the hopper construction, its gate means and appurtenant parts.

Fig. 6 is a plan view of parts shown in Fig. 5.

Fig. 7 is an enlarged plan partly in horizontal section of one of the cells in Fig. 2 looking down upon its fixed and movable grates. In this figure only one multiple bar of the fixed grate is shown in order to disclose underlying structure comprising means for operating the movable grate which in this instance is of the hinged type.

Fig. 8 is a vertical section partly in elevation on the line 8—8 in Fig. 7 looking in the direction of the arrows.

Fig. 9 is a vertical section partly in elevation on the line 9—9 in Fig. 8 looking in the direction of the arrows.

Fig. 10 is a view corresponding to Fig. 8 except that it shows a movable grate of the sliding type. It also shows the portable cleaning machine in operative position in connection with a cell of the furnace and further shows a pneumatic ram as a part thereof for the power operation of the sliding grate. This figure also illustrates the quencher-means.

Fig. 11 is a vertical section on the line 11—11 of Fig. 10 looking in the direction of the arrows.

Fig. 12 illustrates a hand lever means for operating the sliding grate.

Fig. 13 is a plan view of the fixed and movable grates of one cell corresponding to Fig. 7 except that it shows the sliding form with means for its operation and, Fig. 14 is a plan view of the construction underlying the grates in Fig. 13 to show the sliding grate operating means; also the quencher system; and the means for automatically operating it from the movable grate.

Describing now the devices of the drawings and referring in the first instance more particularly to the devices of Figs. 1, 2 and 3, the furnace there shown is an elongated rectangular structure having a combustion-chamber J between one end of the furnace and the fire bridge wall 10 and having a refuse-receiving and burning chamber K between said bridge wall and the other end of the furnace. In the particular furnace shown, this burning chamber K comprises eight cells designated A to H inclusive in two longitudinal rows A to D and E to H, arranged side by side so that cell A transversely of the furnace is adjacent to cell E, cell B is adjacent cell F and so on, as best shown in the plan view Fig. 2.

Each cell below the grates 22 is bounded by low suitably supported fire brick walls 12, 14, 18 and 20 to form an individual ash-pit P for each cell; and the tops of these walls indirectly support the grates 22 for the individual cells. Above the grates and between them and the top of the furnace, there are no dividing walls to prevent the heat from the material burning on the grate of any cell or cells from being communicated to material on the grate of any other cell or cells which may be too wet to burn and needs drying out.

The combined horizontal section and plan view, Fig. 2, is taken through the boundary walls of the ash-pits of cells A, B, E, F, but at cells C, D, G, H, is a plan view looking down on top of the grates of the last named group of cells and there shows (as does also Fig. 1) the referred to open communication between the cells above their grates for the transfer of heat from one cell to another both lengthwise and transversely of the furnace.

The end walls of the furnace are designated 12, the side walls 14, and the top wall is designated 16. A low central longitudinal brick wall 18 runs between one end wall 12 and the fire bridge 10 and divides the ash-pits of the cells A—D from the ash-pits of cells E—H. Low transverse division brick walls 20 run from said longitudinal division wall 18 to the side walls 14 of the furnace and separate the ash-pits of longitudinally adjacent walls from each other.

The combustion chamber J (Fig. 1) extends downwardly, closed on all sides by the furnace side-walls 14, fire-bridge wall 10 and furnace end-wall 12. The combustion chamber is also closed at the bottom and leads out via the flue 24 to a chimney not shown.

Below the ash-pits P is the ash tunnel T whose floor is designated 26. This tunnel extends lengthwise of the furnace between the fire bridge wall 10 and the far end wall 12 under the ash-pits of all the cells and is not shut off by any transverse division walls.

28 is the stoking floor and 28ª the charging floor. From the latter, the material to be incinerated is dropped into one or the other of the openings 152 in the charging floor, whereupon the material falls into one or more of the charging hoppers 30, one over each cell, delivering into charging openings 32 in the top 16 of the furnace, each opening controlled by a sliding gate 34 as will be explained later in further detail.

Each cell has the usual clinker door 36 and ash-pit door 38 controlling corresponding openings through the side walls of the furnace. Also there are the usual stoking openings 40 through the clinker doors controlled by the usual closures.

The grade over the ash-pit of each cell comprises a fixed portion 22 and a movable portion, which in Figs. 1–3 is designated 42 and in the sliding modification (Figs. 10 et seq.) is designated 92. The movable grate 42 (Figs. 1–3) is of the hinged downwardly dumping type. The details of these grates and of their operating mechanism will be described later.

It will be noted that all of the movable grates occupy the central longitudinal zone of the burning chamber over the mouths of the ash hoppers 44. There is one of these ash hoppers for each transverse pair of cells. Each hopper may have, as shown, parallel end walls and convergent side walls which converge downwardly toward each other. Each hopper is supported in the upper part of the ash tunnel T with its rectangular mouth sealing a corresponding opening in the floor of the ash-pits of a transverse pair of cells. The delivery mouth of the hopper is adapted to be closed and opened by a suitably supported and guided slidable gate 46 operated by a suitably supported and connected compressed-air piston-and-cylinder 48.

Wherever permitted by the absence of door openings and the like, the walls of the burning and combustion chambers of the furnace including the end, side and top walls 12, 14 and 16, also the fire-bridge wall 10, are made double so as to contain an air space 50 between them. The inner wall throughout is designated $a$; and is preferably a hung fire-brick wall. The outer wall designated $b$ is made of sheet-iron or the like, and is lined on its inner face with a relatively thick layer of asbestos-board $c$ or equivalent heat-insulating material.

Louver or slide-valve controlled air-intake openings 52 lead through the outer wall $b$—$c$ of the double wall and are located at numerous points around the furnace and wherever the construction permits, preferably as low down as possible. Two motor driven fans 53, at one end of the furnace are operatively connected with the air space 50 of the double wall to draw atmospheric air into and through said space via said adjustable louver openings 52. This air is strongly heated in its passage over the inner wall $a$ and is delivered by the fans into two ducts 54 (compare Figs. 1 and 3) running lengthwise in the upper part of the ash tunnel on either side of the ash hoppers 44. Branch ducts 56 (Figs. 1 and 3) respectively containing regulating valves 67, lead from the ducts 54 up through the floor of the individual ash-pits to deliver the hot air under and up through the grates. The foregoing answers all the purposes of a preheater which heretofore had to be provided and maintained as a separate additional unit at considerable expense. It will be understood that the louvers or valves of the air inlets are adjusted all around the furnace so that those further away from the fans will draw in as much air as those nearer the fans.

The air to be adequately heated must not be drawn by the fans too rapidly through the space between the furnace walls and yet there must be a sufficient volume of air fed under the grates for oxidation and combustion of the refuse, therefore to make up this volume, I provide the cold air intake ducts 63, one into each fan. A valve 65 in each duct 63 enables the air entering through these ducts to be adjusted and limited as to quantity as compared with the heated air coming through the double wall air space.

It is not necessary to show or describe such engineering details as the means for supporting and binding together the walls of the furnace and at the same time allowing for their expansion and contraction since these form no part of the invention. For example, it is unnecessary to show or describe the construction which includes buckstays 58 at the sides and ends of the furnace with their upper ends bound together by cross members; or to describe other mere engineering details.

Returning now to the details of the grates. The fixed grate preferably consists of multiple grate bars 60 (one of which is shown in Figs. 7 and 8) arranged side by side with their front ends resting upon and interlocking with a hook shaped flange 62a on a metal plate 62 capping the front wall of the ash-pit of each cell. The rear ends of these grate bars are supported on a bearing-bar 64, one for each cell, supported longitudinally of the furnace by the engagement of its ends with the division bars 65 laid down on the walls of the cell at the ends of the bearing-bar. The space between each bearing-bar 64 and the longitudinal ash-pit wall 18 is largely occupied by the movable grates 42.

The top of the longitudinal brick wall 18 is protected from the intense heat by being covered with a hollow metal housing 66 which preferably runs the full length of said wall and has a closed end at the fire bridge wall 10 and at its other end extends through the end wall 12 of the furnace and connects with the air circulating means or fans 54, whereby air is forced from the fans (of Figs. 1, 2, 3) via the cross-duct 55 connecting ducts 54 into branch duct 57 into the open end of the hollow housing and out through slide-valve protected openings 59 in its bottom wherever it overhangs the fire brick wall 18 that supports it. The delivery from the aforesaid branch duct 57 is controlled by valve 61. This air keeps the metal housing relatively cool and protected from the destructive action of the incineration heat; and also prevents clinkering of the material on the housing. The escaping hot air from the housing valved openings 59 delivered into the ash-pits, comes up through the grates like the hot air from the ducts 54—56 and further assists in supporting and intensifying the combustion especially at the back of the cells where needed.

Occupying the ends of the space between the bearing bar 64 and the hollow housing 66 are the stationary slotted plates 70. The movable grate 42 for each cell (compare Figs. 1–3 inclusive and 7–9 inclusive) is in two sections trunnioned at 72 between bearing bar 64 and housing 66 so as to swing from a horizontal, fuel-supporting position downwardly into the ash-pit. Fig. 9 shows one section of this grate up and the other section down.

Toggle means is shown for operating each of these hinged grate sections independently. Briefly, this means (best shown in enlarged detail views Figs. 7 to 9) comprises a pair of toggle arms 74 and 76 pivoted together at 77. The arm 74 is fixed on a rock-shaft 78 and the arm 76 is pivotally connected to a lug 42a on the grate-section 42. The rock-shaft 78 is journaled in pillow-blocks 80 supported on the adjacent ash-pit wall so that the shaft is horizontally disposed and so that its front end extends through the side wall of the furnace and outside the furnace is equipped with a short crank arm 82 adapted to fit up into a socket in the end of a detachable hand-lever 84 (Fig. 1) for rocking the shaft 78 and operating the toggle arms to raise and lower the connected grate-sections 42. Where the toggle arms are pivoted together, the arm 74 is U-shaped in transverse section, the sides of the U straddling the other arm 76 (compare Figs. 8 and 9) and a screw 86 projects through the closed end of the U into adjustable contact with the toggle arm 76 so that the toggle can break upwardly but not downwardly and so that when the grate is in its "up" position the arms are somewhat below a true straight line position (thereby locking the grate section in its up position) but not so far below as to make it difficult to break the toggle upwardly by operating the hand lever means when it is desired to lower or dump the grate.

88 designates counterweights on crank arms 90 adjustably affixed to the rock-shaft 78 so that when the toggle arms are straightened and the grate is up, said counterweights sufficiently tend to keep the arms straight to prevent unintentional dumping of the grate when loaded. On the other hand, these weights assist in raising the grate from its down to its up position and thereby make it easier to operate the levers 84 to close the grates.

Figs. 10–14 are enlarged detail views showing, as a substitute for the hinged dumping grates 42, a sliding grate construction. In these figures the sliding grate 92 is in a single section for each cell, occupying when closed the space bounded by the perforated plates 70—70, the bearing bar 64 and hollow housing 94. This housing is necessarily wider than the previously described housing 66 (Figs. 1–3) but otherwise is the same as to its location and as to the means for ventilating and cooling it. The housing 94 is made larger than housing 66 (Figs. 1–3) to enable the sliding grate 92 of either transversely adjacent cell to be slid into it as indicated by the dotted lines in Fig. 10 through suitable openings provided as shown in the sides of the housing 94.

Both power and hand-lever means are shown for sliding the grates 92. Thus a rod 96 slides in a tubular sleeve 98 extending transversely of the furnace, said sleeve being stationarily mounted in the given ash-pit by having its forward end secured in a socket 100 on the wall of the furnace and by having its rear end secured by a pipe clamp 102 to an ankle iron 104 (Fig. 10) suitably stationarily supported by means not necessary to show in detail. The inner end of the aforesaid rod 96 is connected to a U-shaped yoke 106. The arms of this yoke are supported and guided for reciprocation by suitably supported guide brackets 108. The free ends of the yoke arms are connected by a rod 108 which passes freely through lugs 92a on the grate 92. The aforesaid rod 96 at its forward end has the shorter rod 110 pivoted thereto. When this rod 110 is held in alignment with 96 it can be pushed into the tubular sleeve 98 to force the yoke rearwardly and to slide the connected grate 92 into the housing.

It will be understood that neither the housing 66 of Figs. 2 and 3 nor the housing 94 of Fig. 10 interferes with the free interchange of heat between the cells longitudinally and transversely of the burning chamber, said housings being so low that they are completely submerged by the material piled upon the grates for incineration. The preferable inverted V-shaped roof of the housing tends to confine the refuse to the cell wherein it was originally placed but of course during the working of the material on the grates there is some interchange between transverse cells but this produces no bad result.

The power means for operating the sliding grate 92 of any cell into and out of the aforesaid housing consists of a compressed-air piston-andcylinder 112 mounted on a carriage 114 with the piston rod detachably connected by a pivot pin 116 to the free end of the previously described rod 110. Fig. 10 shows the parts positioned after the air cylinder has been operated to pull the sliding grate forward into its closed position. Pivot pin 116 can then be removed to disconnect the power cylinder 112; and the rod 110 can then be turned up or down out of the way which is the purpose of making the push-rod in the pivoted-together sections 110 and 96.

Hand-lever means is shown in Fig. 12 for operating the sliding grate. It consists of a bent or elbow lever 118 having a short link 118a pivoted at one end to the point of said elbow. The other end of this link 118a can be removably and pivotally attached to the end of the push rod 110 by a pivot pin 120. The other end of said elbow lever can be similarly removably attached by a pivot pin 122 to one end of a link 124 whose end is pivoted to a metal base 126 secured in depressed position in the stoking floor in front of the given cell of the furnace. When the lever 118 is connected as shown in Fig. 12, it will be seen that it can be operated between its full and its dotted line positions to slide the grate into its open and closed positions. When not in use the lever may be detached by removing the pivot pins 120 and 122. Also the link 124 can be gotten out of the way by pushing it down into the recess in the floor.

An automatic quencher system is provided for automatically wetting down the incinerated charge as soon as the movable grate of the given cell is open preparatory to cleaning its charge into the ash hopper. This wetting down breaks up the slag and makes the incinerator mass friable and easier to handle. It also extinguishes the ashes so that they can be directly loaded into trucks from the ash-hoppers 44.

The quencher system is best shown in Fig. 3 and Figs. 10-14 inclusive. There is an independent quencher system in the ash-pit of each cell consisting of a pipe 128 bent or otherwise formed into rectangular shape conforming to and located at the mouth of the opening leading from the ash-pit into the ash-hopper. Each of these rectangular quencher rings or heads 128 is equipped with a plurality of spaced apart nozzles 130 for spraying the water inwardly and downwardly on the ashes or incinerated mass received through the movable grate opening and from the ash-pit. Each spraying head 128 is connected with a water supply pipe 132 by a self-closing valve 134 having an operating handle connected by a chain 136 and a long spiral spring 137 to the movable grate so that said valve is automatically pulled open by the grate as it moves into its open position. The principle is the same whether the movable grate be of the sliding or hinged type, namely an operating connection is made between the grate and valve whether it be by a chain and extensible spring as shown, or any other form of means suited to the purpose which will open the valve automatically from the grate's movement into open position. Reversely on closing the grate, the chain or equipment operating connection is put out of operation; and the valve being of the self-closing type shuts off the water supply to the connected quencher head and nozzles.

Whereas the grate of any cell can be cleaned of the incinerated charge by the use of hand operated tools projected through the clinker door opening to push the charge into a movable grate opening, this is an arduous time-consuming operation and I have provided a mechanical cleaning machine to do this work. This machine, best shown in Fig. 10, comprises a compressed-air operated piston-and-cylinder 140 mounted at the level of the clinker-door openings on the same carriage 114 previously referred to as serving to carry the air cylinder 112 for power operating the individual sliding grates. This carriage rolls on casters 142 and is portable in that it is intended to be rolled along the stoking floor from one cell to another as and when needed; and there anchored in position and operated. On the end of the piston rod of the air cylinder 140 is a transverse plate or pusher-head 144, (Fig. 10) able to pass comfortably through the clinker door opening and, when the piston is operated, to push the greater part of the incinerated charge into the movable grate opening, especially since the charge often tends to become agglomerated together by the incineration. A stationary tubular sleeve 145 on the carriage parallels the air cylinder 140; and a rod 147 slidable in this sleeve is connected with the pusher-head 144 to prevent rotary displacement of said head. There may be a similarly connected sleeve 145 and rod 147 on the other side of the carriage. Compressed-air rams being well known, it would be superfluous to describe the piping-connections and valve-controls indicated in part in the drawings for controlling the compressed-air to operate the piston and the pusher-head as described, and to retract it.

For quickly acting and releasing the carriage, I provide bolts 146 pivoted to anchorages recessed in the stoking floor so that when the bolts are not in use they may lie in recesses below the floor level. The free end of these bolts is threaded and each bears a nut 148. The carriage has forked brackets 150 into which the bolts are receivable and against which the nuts 148 bear when tightened. The bolts are located to be engageable with the forked brackets when the carriage is in its proper operating position for the particular cell; and being located at both ends of the carriage, usually two at each end, serve adequately to anchor the carriage to enable the air cylinders and connected parts to perform their work.

Referring now to the previously referred to hoppers 30 and related features best shown in Figs. 1, 3 and 4-6, it will be understood that in the case of an eight cell furnace like that illustrated, there are two large rectangular openings in the charging floor 28 bounded by the sides 152. One of these openings in the charging floor is located over all four of the charging openings N in the furnace roof over the four cells A, B, E and F and the other opening in the charging floor is located over the charging openings N for the other four cells C, D, G and H. Thus, each charging-floor opening supplies the refuse to be incinerated to one half of the furnace. The aforesaid charging openings N in the furnace-roof are also rectangular and are independently controlled by rectangular sliding gates 34, each operated by its own compressed air piston-and-cylinder 153 suitably connected therewith and supported as indicated in Fig. 3.

Since these gates receive the full heat of the furnace they must be made of fire brick or the like, and being necessarily heavy, I provide each gate with flanged wheels 156 at the sides, which run on tracks 158 as the gate is slid into and out of closing position over the related charging opening N in the top of the furnace. When the gate is in its closing position, the wheels rest in depressed parts of the track which let the gate down into sealing contact with the mouth of the opening N whereas during the time the gate is being slid out of said final position, the wheels ride up quick inclines 159 to the higher portions of the track which lift the gate out of contact with the mouth of opening N so that it can move freely without contacting the top of the furnace.

Mounted within each charging floor opening 152, but below its level is a four walled rectangular casing 160, open at the top and bottom. The lower edges of the walls of this casing just clear at all times the slidable gates 34. Within this casing 160 is secured another structure 162 which is cross-shaped and in effect consists of two inverted V-shaped parallel-walled structures intersecting each other at right angles. Fig. 4 is a plan on an enlarged scale as compared with Fig. 3 looking down from the charging floor 28 upon the described structure 162 within the four walled casing 160. The result is that the rectangular casing 160 is converted into four hoppers 30, each having approximately the same rectangular cross section as a charging opening N in the top of the furnace and each located directly over an opening N separated therefrom only by a gate 34 whereby when the gate is opened the refuse to be incinerated is allowed to drop directly through the opening N substantially centrally upon the grate of the cell below. The further result is that the refuse to be incinerated, when dumped into the charging floor opening 152, strikes the A-roofs of the structure 162 and slides off said roofs into the several charging hoppers 30 and is thus automatically distributed into said hoppers.

As a further feature, I provide means well shown in Figs. 5 and 6 for giving continuity to the walls of each hopper 30 down to the mouth of the corresponding furnace charging opening N when the gate has been withdrawn. This consists of a U-shaped member 164, one for each hopper, straddling it in horizontal position and being swingingly upheld by parallel links 166 connecting the arms of the U with the sides of the hopper. Normally, that is to say when the gate 34 is closed, the member 164 rests on top of the gate in the dotted position shown in Fig. 5 but as soon as the gate is withdrawn, the member 164 swings down into the full line position wherein the flat strips that constitute its arms and the connecting piece at the closed end of the U constitute the walls which guide the refuse down into the underlying furnace charging opening N and otherwise serve to keep the refuse within bounds. The end of the opened gate obviously guards the fourth side of the space of which the U-shaped member closes the remaining three sides. As the gate closes, it automatically swings the U-shaped member up out of the way into the dotted position in Fig. 5; and for this purpose is provided with beveled or wedging lugs 170, one on each side, in line with the reversely beveled ends of the arms of the U-shaped member for engagement therewith to cause said member automatically to ride up on top of the gate as it closes.

It is unnecessary to say more about the mode of operation of the furnace because this will be sufficiently evident to those skilled in the art, and because it has already been sufficiently described in the preliminary part of the specification and in connection with the description of the various parts.

It is to be understood that the invention is not limited to the specific constructions herein shown and described because these are to be taken as illustrative of the invention without limiting it to the details thereof except as required by the claims considered in connection with the prior art. Moreover it will be appreciated that the illustrative constructions may be changed in many respects and some parts may be used without others or with the addition of parts without departing from the spirit of the invention or the scope of the appended claims.

What I claim is:—

1. In an incinerating furnace, the combination of a burning chamber containing side by side longitudinal rows of grates, there being free communication lengthwise and crosswise of the burning chamber above the grates; said grates in the middle longitudinal zone of the burning chamber severally comprising portions movable at will to provide discharge openings for the incinerated matter when cleaning the grates; and door-protected openings in both sides of the furnace leading into the burning chamber, said door-protected openings being individual to said grates enabling the charge on each grate to be worked from the related door-opening and to be dumped through the discharge opening in said grate.

2. In an incinerating furnace, the combination of a burning chamber containing side by side longitudinal rows of grates, there being free communication lengthwise and crosswise of the burning chamber above the grates; ash-pits in side by side longitudinal rows located under and corresponding to the side by side longitudinal rows of grates; and a single longitudinal row of ash hoppers under the ash-pits along the middle longitudinal zone of the burning chamber, each transverse pair of ash-pits delivering into one of said ash hoppers.

3. In an incinerating furnace, the combination of a burning chamber containing side by side longitudinal rows of grates, there being free communication lengthwise and crosswise of the burning chamber above the grates; said grates in the middle longitudinal zone of the burning chamber severally comprising portions movable at will to provide discharge openings for the incinerated matter when cleaning the grates; and a hollow metal housing between the double rows of grates extending centrally lengthwise of the burning chamber, the displaceable grates being severally slidable transversely of the burning chamber into and out of said housing through openings in the longitudinal sides thereof.

4. In an incinerating furnace, the combination of a burning chamber containing side by side longitudinal rows of grates, there being free communication lengthwise and crosswise of the burning chamber above the grates; ash-pits in side by side longitudinal rows located under and corresponding to the side by side longitudinal rows of grates, said ash-pits being bounded by brick walls of which one is a longitudinal wall between the side by side longitudinal rows of ash-pits; and an air ventilated hollow metal housing located on the top of said longitudinal wall in protection thereof.

5. In an incinerating furnace, the combination of a burning chamber containing side by side longitudinal rows of grates, there being free communication lengthwise and crosswise of the burning chamber above the grates; door protected openings in both sides of the furnace leading into the burning chamber enabling each longitudinal row of grates to be worked to its full extent transversely of the burning chamber without interference from any back wall, said grates in the middle longitudinal zone of the burning chamber severally comprising portions movable at will to provide discharge openings for the incinerated matter when cleaning the grates; and a power-operated pusher-head enterable through said door openings, suitable for shoving the incinerated mass along the individual grates towards the center line of the burning chamber for discharge through the opening left by its movable grate-portion.

6. In an incinerating furnace, the combination of a burning chamber containing side by side longitudinal rows of grates, there being free communication lengthwise and crosswise of the burning chamber above the grates; said grates in the middle longitudinal zone of the burning chamber severally comprising portions movable at will to provide discharge openings for the incinerated matter when cleaning the grates; door-protected openings in both sides of the furnace leading into the burning chamber for working the material supported on the grates; a power-operated pusher-head enterable through said door openings suitable for shoving the incinerated mass along the individual grates towards the center line of the burning chamber for discharge through the opening left by its movable grate-portion; and a carriage on which said power-operated pusher-head is mounted for portability at the level of said door openings in the walls of the burning chamber for operation with the respective grates.

7. In an incinerating furnace, the combination of a burning chamber containing side by side longitudinal rows of grates, there being free communication lengthwise and crosswise of the burning chamber above the grates; the four walls and roof of said furnace being double with an intermediate air space; and an air preheating system utilizing said air space in said walls and roof and comprising adjustable louvers or valves for differentially controlling the entrance of atmospheric air into said air space all around said furnace, and fan and duct means connected with said double wall air space arranged to draw atmospheric air past said louvers into and through said double wall space and deliver it under the respective grates.

8. In an incinerating furnace, the combination of a burning chamber containing side by side longitudinal rows of grates, said grates in the middle longitudinal zone of the burning chamber severally comprising portions movable at will to provide discharge openings for the incinerated matter when cleaning the grates, the movable portion of each grate consisting of two hinged downwardly-dumping sections hinged at opposite sides of the grate so that when in their horizontal or up position, the free ends of said sections are adjacent; and a rock shaft and toggle means for each hinged section operatively connected therewith, one end of said shaft being exposed on the outside of the furnace and being there engageable with lever means for rocking said shaft.

9. In an incinerating furnace, the combination of a burning chamber containing side by side longitudinal rows of grates, there being free communication lengthwise and crosswise of the burning chamber above the grates; ash-pits in side by side longitudinal rows located under and corresponding to the side by side longitudinal rows of grates; an ash tunnel extending longitudinally under the ash-pits; ash hoppers in said ash tunnel with their receiving mouths at openings through the floor of the ash-pits; the walls of said furnace being double with an intermediate air space; and an air preheating system utilizing said walls and air space and comprising adjustable louvers or valves for controlling the entrance of atmospheric air into said air space and further comprising fan and duct means connected with said double wall air space arranged to draw atmospheric air past said louvers into and through said space and deliver it under the respective grates, said duct means comprising main ducts running lengthwise of the ash tunnel at the side of the ash hoppers and further comprising branch ducts leading from the main duct into the ash-pits for delivering the preheated air under the grates.

10. The combination defined in claim 7, further characterized by there being controllable air inlet openings leading directly into the fan-means other than from the double wall space.

11. The combination defined in claim 4, further characterized by the underneath portion of the housing having valve-controlled openings leading into the ash-pits and being further characterized by means for forcing air longitudinally through the housing via an end thereof, said air exiting via said valve-controlled openings of the housing into the ash-pits and thence up through the grates.

DESMOND P. TYNAN.

CERTIFICATE OF CORRECTION.

Patent No. 1,991,828.  February 19, 1935.

DESMOND P. TYNAN.

It is hereby certified that error appears in the printed specification of the above numbered patent requiring correction as follows: Page 1, first column, line 62, for the syllable "ef-" read af-; page 2, first column, line 34, for "two" read the; page 4, second column, line 46, for "ankle" read angle; and page 5, first column, line 67, for "equipment" read equivalent; and that the said Letters Patent should be read with these corrections therein that the same may conform to the record of the case in the Patent Office.

Signed and sealed this 23rd day of April, A. D. 1935.

(Seal)

Leslie Frazer
Acting Commissioner of Patents.